Patented July 10, 1934

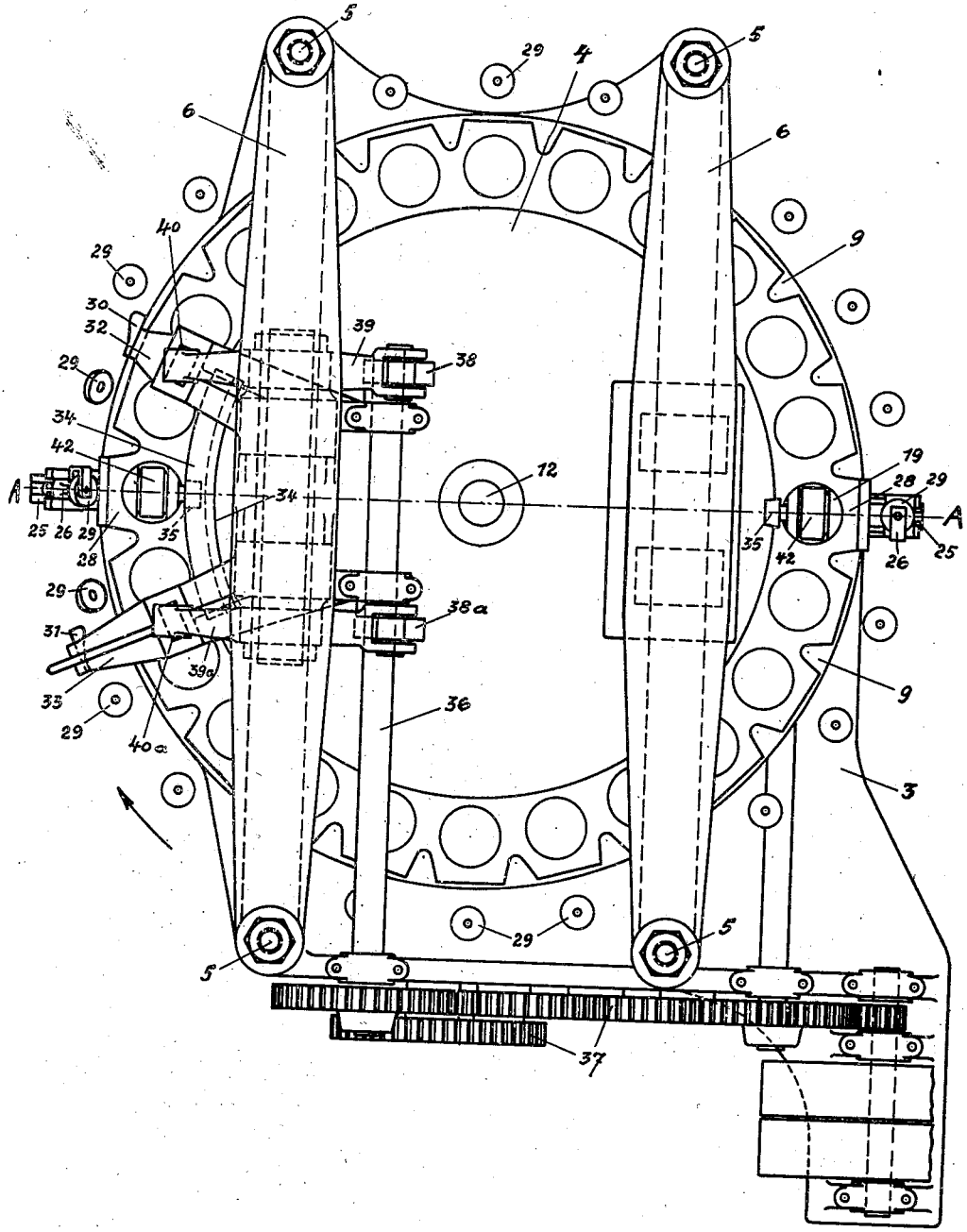

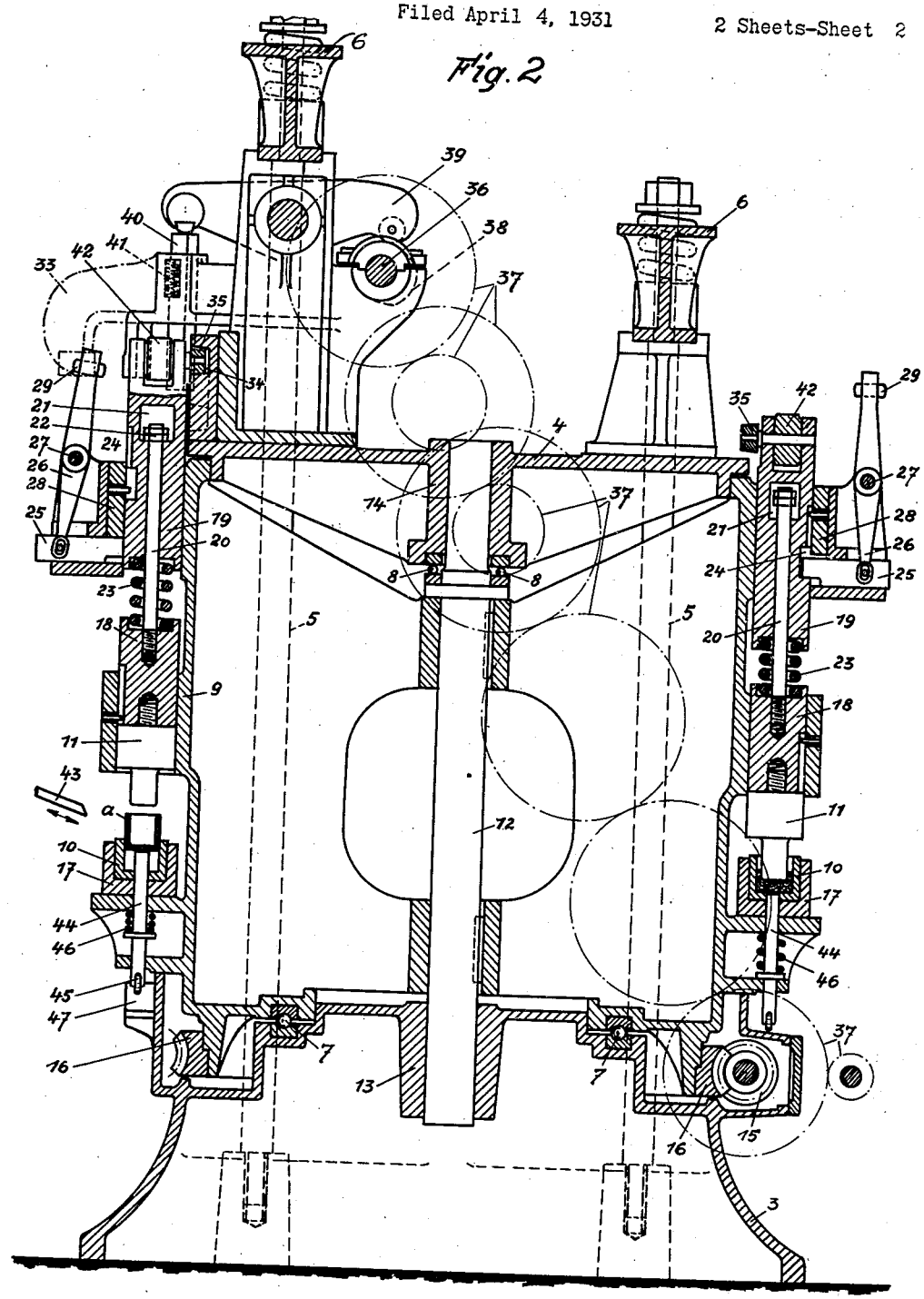

1,965,732

UNITED STATES PATENT OFFICE 1,965,732

HOT-MOLDING MACHINE

Ernst Bisterfeld, Radevormwald, Germany

Application April 4, 1931, Serial No. 527,695
In Germany April 7, 1930

5 Claims. (Cl. 18—20)

My invention relates to hot-molding machines for manufacturing articles of artificial resin or similar materials. Such articles may be casings for electric appliances, such as plug-box covers or the like. The material is placed in molds in pulverulent condition in a manner known per se, brought into pasty or plastic condition by heating the molds, and pressed by a plunger. In order to increase the economy of the manufacture, the material is placed into the molds and molded, and the finished articles are ejected from the molds, in succession and in a continuous operation with any desired number of molds.

It is an object of my invention to improve a machine of the type described. To this end I provide means for subdividing the molding operation into a preliminary and a finishing stage.

In the drawings affixed to this specification and forming part thereof a machine embodying my invention is illustrated diagrammatically by way of example.

In the drawings
Fig. 1 is a plan view, and
Fig. 2 is an axial section of a machine having a rotary mold carrier, taken on the line A—A in Fig. 1.

Referring now to the drawings, the machine comprises a fixed frame including a base portion 3 and a top portion 4, and a rotary mold carrier 9 on a shaft 12 which is mounted to rotate in a bearing 13 in the base portion and a bearing 14 in the top portion. The base and top portions are connected by tension rods 5 and transverse members 6, resilient means such as springs being inserted between the transverse members and nuts at the upper ends of the rods. Ball bearings 7 and 8 are arranged intermediate a bottom flange of the carrier 9, and the boss of the carrier and the upper bearing 14 of the shaft 12, respectively.

10 are the molds and 11 are the pressing tools or plungers for cooperation with the molds, the molds and the plungers being mounted on the carrier 9. Rotation is imparted to the mold carrier by any suitable means, in the present instance, by a worm gear 15, 16. Any number of molds 10 may be provided. In the present instance it has been assumed that the machine is equipped with 24 molds arranged in a circle about the shaft 12 of the carrier 9. Preferably each mold is equipped with a separate electric resistance 17 for heating it. Plungers 11 are arranged in line with the molds at the carrier 9 above the molds. The ram for operating each plunger is subdivided into a pair of slides 18 and 19, the plunger being exchangeably secured to the lower slide 18. 20 is a rod which is secured in the lower slide 18 and fitted to slide in the upper slide 19. 21 is a cavity in the upper slide and 22 is a check on the end of the rod 20 which projects into the cavity. It will be understood that the upper end of the rod 20 is free to move in the cavity 21 and that the check 22 which may be adjustable and is here shown as a pair of nuts, limits the downward movement of the rod 20. 23 is a spring which is inserted between the slides 18 and 19 and held by the rod 20 and, if put under tension, forces the plunger 11 into the corresponding mold 10.

Each upper plunger 19 has a recess 24 which is adapted to be engaged by a horizontal locking bolt 25 when the slide 19 has moved down until its recess 24 registers with the bolt 25, as shown at the right in Fig. 2. 26 is a double-armed lever which is mounted to rock about a pivot 27 on a bracket 28 which extends outwardly from the carrier 9. The lower arm of the lever 26 is connected to the bolt 25 by a slotted eye, and its upper arm is equipped with a roller 29. Only two of the brackets 28 are illustrated in Fig. 1 but the position of the rollers 29 of all double-armed levers is shown. The levers 26 are rocked and the bolts are reciprocated for locking and unlocking the corresponding upper slides 19 by fixed cams 30 and 31, Fig. 1, which extend in opposite directions and are attached to the top portion 4 of the frame by suitable brackets 32 and 33.

34 is a cam plate at the top portion 4 with a cam groove, and 35 are rollers at the upper slides 19 which engage in the cam groove as the slides rotate with the carrier 9. 36 is a shaft which is mounted to rotate in suitable bearings on the top portion 4, and 37 are gears connecting the shaft of the worm 15 to the shaft 36. The ratio of this train of gears is so determined that the shaft during one rotation of the carrier 9 performs as many rotations as there are molds 10 on the carrier. In the present instance, the shaft rotates 24 times per revolution of the carrier 9. 38 and 38a are cams on the shaft 36, and 39 and 39a are double-armed rockers in suitable bearings on the top portion 4 which cooperate with the cams 38 and 38a, respectively. 40 and 40a are pushers which are mounted to slide in the brackets 32 and 33, respectively, and are acted on by the outer arms of the rockers 39, 39a, respectively. Springs 41 hold the pushers engaged with the corresponding rockers. 42 are rollers arranged at the upper end of each slide 19 in line with the rollers 35 and adapted to be engaged by the pushers 40 and 40a.

43, Fig. 2, is a chute forming part of a mechanical filling device, not shown.

Each mold is equipped with an ejector 44 which extends downwardly through the bottom of the mold and is equipped with a spring 46 tending to move the ejector out of the mold in downward directon. 47 is a cam on the base portion 3, and 45 is a roller at the lower end of the ejector for cooperating with the cam.

The operation of the machine is as follows:
The filling of each mold is begun from the chute 43 or by hand when the plunger 11, with its slides 18 and 19, has been moved into its topmost position by the roller 35 in the cam groove of the cam plate 34, as shown at the left in Fig. 2. The material to be molded, for instance, artificial resin (bakelite), is supplied in pulverulent or tabloid condition. Any material which has been supplied in excess may be removed by a suction device, not shown. As the carrier 9 rotates in the direction of the arrow, Fig. 1, the roller 35 moves down in the groove of the cam plate 34, moving down the slides 18 and 19 and forcing the plunger 11 into the mold 10 until the material cannot be compressed any more. In the meantime the roller 42 at the top of the upper slide 19 has arrived below the pusher 40. At this moment the cam 38 operates its rocker 39, forcing down the pusher 40. The slide 19 is depressed by the pusher while the slide 18, with the plunger 11, is arrested since the material in the mold has been compressed to the limit, as mentioned. The spring 23 between the slides 18 and 19 is now compressed and held in compressed condition by the bolt 25 which locks the slide 19 as shown at the right in Fig. 2. Locking of the slide 19 occurs when its recess 24 registers with the bolt 25. At the same moment the roller 29 engages the cam 30, rocking the double-armed lever 26 and pushing the bolt 25 into the recess 24.

The article is molded and "baked" while the carrier 9 continues its rotation. When the material in the heated mold has attained a certain plastic condition the energy which has been stored in the compressed spring 23 causes the plunger 11 to penetrate completely into the mold, finishing the molding operation. When the baking process has been completed the mold arrives at the front end of the cam plate 34. At the moment the roller 29 corresponding to this mold engages the cam 31 the cam 38a forces down the pusher 40a by means of the rocker 39a. The action of the rocker 39a is transmitted to the upper slide 19 by the roller 42, relieving the bolt 25 from the upward reaction of the spring 23. The bolt 25 is now readily extracted from the recess 24 in the upper slide by the cam 31. The roller 35 moves upwards in the cam plate and extracts the plunger 11 from the mold by raising the slides 18 and 19.

The finished article a, Fig. 2, at the left, is now ready for ejection. This is effected by hand or by the ejector 44 in cooperation with the rising cam 47 and the roller 45. The spring 46 on the ejector 44 is compressed and returns the ejector into its lower final position as shown at the right in Fig. 2, after it has been released by the cam 47. The finished articles are removed from the machine by any suitable automatic means, not shown, or by hand.

The invention is not limited to the example illustrated. Thus, instead of a rotatable mold carrier 9, with the molds 10 arranged in a circle about its axis, I may provide a reciprocating molding table having molds arranged in straight lines. Instead of mechanical means for operating the plungers 11 as shown, I may provide hydraulic, electric or pneumatic means.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modifications not covered by these claims is expressly reserved.

I claim:

1. A hot-molding machine for continuous operation comprising movable heated molds, a plunger adapted to cooperate with each mold, fixed means for operating said plungers, means for moving said molds and said plungers past said operating means continuously and at uniform velocity, and means intermediate said plungers and said operating means for storing energy by the reaction of the material in the molds while such material is in unplastic condition.

2. A hot-molding machine for continuous operation comprising movable heated molds, a plunger adapted to cooperate with each mold, fixed means for operating said plungers, means for moving said molds and said plungers past said operating means continuously and at uniform velocity, and mechanism intermediate said plungers and said operating means including a resilient member and means controlled by said fixed operating means for compressing and releasing said member.

3. A hot-molding machine for continuous operation comprising movable heated molds, a plunger adapted to cooperate with each mold, means for moving said molds and said plungers continuously and at uniform velocity, means for subdividing the molding operation into a preliminary and a finishing stage, automatic means for holding said plungers in their final position during a portion of the molding operation, and fixed positive camming means for moving said holding means into and out of active position with respect to said plungers.

4. A hot-molding machine for continuous operation comprising movable heated molds, a plunger adapted to cooperate with each mold, means for moving said molds and said plungers continuously and at uniform velocity, means for subdividing the molding operation into a preliminary and a finishing stage, a pair of slides per plunger to one of which the plunger is secured, an energy-storing member intermediate said slides, automatic means for holding the slide to which said plunger is secured in its lower final position, and means for compressing said member before operating said holding means.

5. A hot-molding machine for continuous operation comprising movable heated molds, a plunger adapted to cooperate with each mold, means for moving said molds and said plungers continuously and at uniform velocity, means for subdividing the molding operation into a preliminary and a finishing stage, a pair of slides per plunger to one of which the plunger is secured, an energy-storing member intermediate said slides, automatic means for holding said slide to which said plunger is secured in its lower final position, means for compressing said member before operating said holding means, and means for relieving said holding means from the pressure of said member.

ERNST BISTERFELD.